United States Patent [19]

Korta et al.

[11] 4,034,558

[45] July 12, 1977

[54] COOLING APPARATUS FOR SPLIT SHAFT GAS TURBINE

[75] Inventors: John Korta; Walter R. Ward, both of Stoney Creek, Canada

[73] Assignee: Westinghouse Canada Limited, Hamilton, Canada

[21] Appl. No.: 697,060

[22] Filed: June 17, 1976

[30] Foreign Application Priority Data

Oct. 14, 1975 Canada .......................... 237574/75

[51] Int. Cl.$^2$ ...................... F02C 3/10; F02C 7/18
[52] U.S. Cl. .......................... 60/39.16 R; 60/39.66; 415/115
[58] Field of Search ................... 60/39.16 R, 39.66; 415/115, 116, 117

[56] References Cited

U.S. PATENT DOCUMENTS

| 2,749,087 | 6/1956 | Blackman et al. ................ 60/39.66 |
| 3,034,298 | 5/1962 | White ................................. 60/39.66 |
| 3,275,294 | 9/1966 | Allen et al. ....................... 415/115 |
| 3,945,758 | 3/1976 | Lee .................................... 415/115 |

Primary Examiner—Carlton R. Croyle
Assistant Examiner—L. J. Casaregold
Attorney, Agent, or Firm—Robert H. Fox; Edward H. Oldham

[57] ABSTRACT

This invention relates to cooling a section of a split shaft gas turbine engine. Because combustion takes place in the region of the shaft-split, overheating may occur and care must be taken to ensure that this portion of the turbine is sufficiently cooled. This invention is concerned with bleeding a portion of the compressed air from an intermediate stage of the compressor turbine and feeding the compressed air into a manifold. Next the air is fed by means of suitable conduit members into the split-shaft region of the turbine. Provision is made to feed this air to the faces of the power disc for the compressor section and the face of the power disc for the output power section of the turbine. Various other parts of the turbine are also cooled in the split shaft region of the turbine.

1 Claim, 4 Drawing Figures

COOLING APPARATUS FOR SPLIT SHAFT GAS TURBINE

CROSS REFERENCE TO RELATED APPLICATIONS

U.S. application Ser. No. 697021, filed 06/17/76, in the name of John Korta, entitled Adjustable Vane Assembly For A Gas Turbine (CW-998).

U.S. application Ser. No. 694,926, filed 06/11/76, in the names of John Korta, Arthur W. Upton, John Danko and Azizullah, entitled Cooling Apparatus for a Bearing in a Gas Turbine (CW-999).

U.S. application Ser. No. 694,928, filed 06/11/76, in the name of John Korta, entitled Vane Rotator Assembly for a Gas Turbine (CW-1000).

U.S. application Ser. No. 697,060, filed 06/17/76, in the names of John Korta and Walter R. Ward, entitled Cooling Apparatus for Split Shaft Gas Turbine (CW-1001).

BACKGROUND OF THE INVENTION

It has been common practise to feed cooling air from an intermediate stage of the turbine compressor to various "hot spots" in gas turbine engines to provide the necessary cooling. This has been done traditionally by means of hollow pillars or by passing the cooling air through hollow blades or vanes in the turbine. Both these methods have drawbacks in that the hollow pillars tend to interrupt the flow of hot gasses and generally lower the turbine efficiency. Turbulence may result which may lead to blade vibration and shortened blade life.

Feeding cooling air through hollow stationary blades may set up thermal stresses in the turbine structure which may cause twisting or warping which can lead to premature failure of the stressed components in the machine. In particular any bearings in the combustor region of the turbine are subject to overheating and some means must be found to cool bearings in the combustor region. Similarly in the turbine under question some means must be found to cool the parts of the turbine in the region of the split-shaft or severe overheating will occur.

SUMMARY OF THE INVENTION

Provision is made to bleed a portion of the air from an intermediate stage on the turbine compressor and this air is fed into a manifold assembly. The manifold assembly serves to feed air into the gas turbine in the split shaft region so that various diverse parts in this region are cooled by this compressed air. In particular the end faces of two shafts in this "split" are cooled as are the faces of the turbine discs which are exposed in this region by the compressed air from the intermediate turbine stage. This cooling is effectively carried out by a diaphragm member which causes the cooling air to flow in a predetermined manner over the faces of the shafts and discs.

BRIEF DESCRIPTION OF THE LIST OF FIGURES

Figure 1:
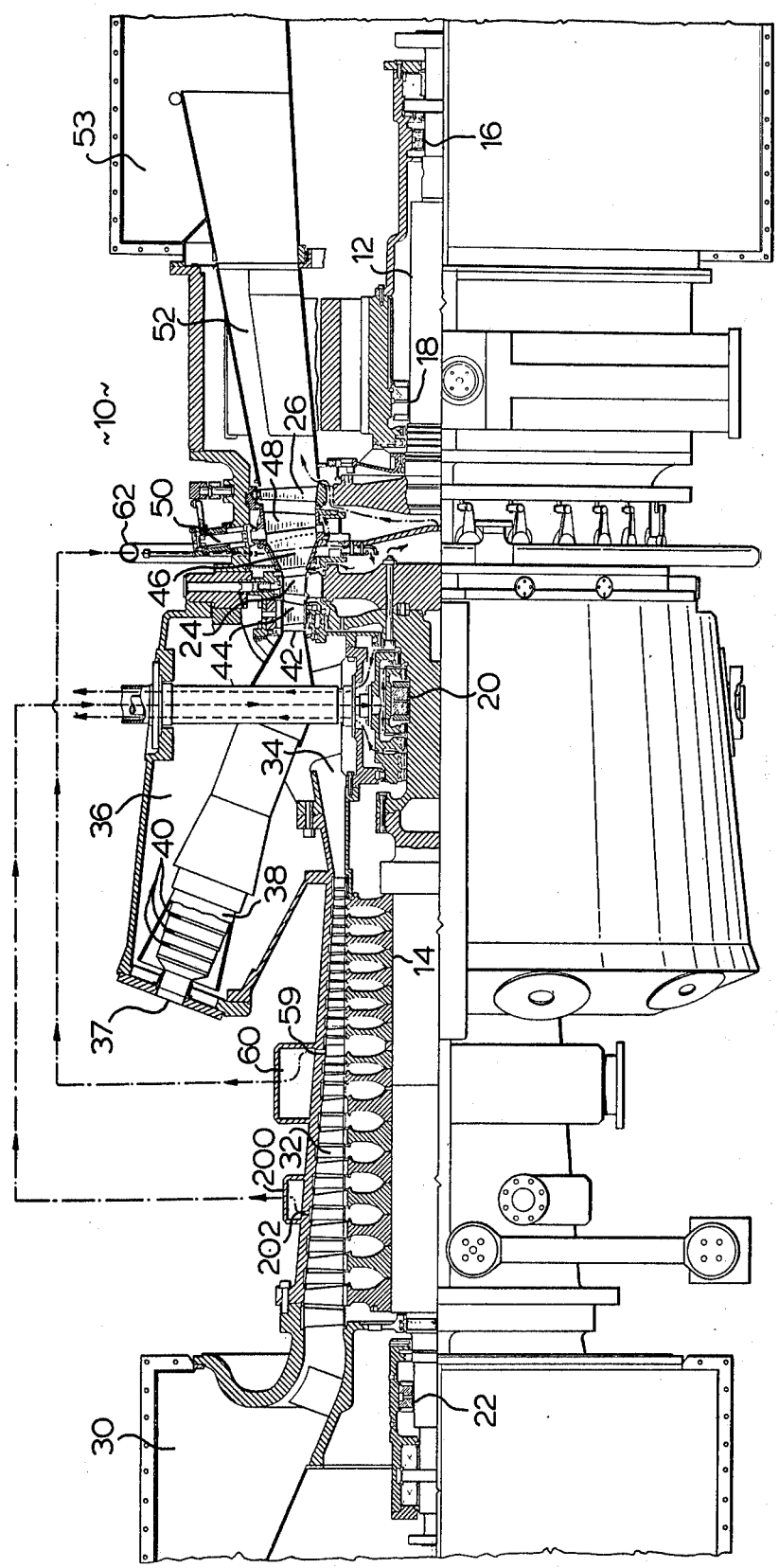
FIG. 1 is a partial sectional view of the gas turbine to which this invention applies.

Referring now to FIG. 1, it will be seen that a double shafted turbine 10 is shown, having output power shaft 12 and compressor shaft 14. Power output shaft 12 is journalled in bearings 16 and 18 and compressor shaft 14 is journalled in bearings 20 and 22. Power to drive the compressor section of the compressor turbine is supplied by blades 24. The power blades 26 are provided to drive output shaft 12 to supply power to a load.

As the operation of the complete turbine is fairly obvious to those skilled in the art only a brief description of the overall turbine will be given here.

Air is supplied to intake plenum 30 and is subsequently drawn into the compressor stages 32 and compressed. When the air passes through the last blades of the compressor stage it will have attained a pressure of 90-100 psi. At this time the compressed air is ducted through outlet 34 into the combustor casing 36 of the turbine. Turbine fuel is supplied to fuel inlets 37 of the turbine baskets 38 and the compressed air is passed through passages 40 in baskets 38 where it is mixed with the atomized fuel and is subsequently burned. The hot burning gas passes through the basket outlet 42 and is passed through a set of anti-turbulent vanes 44. The gas then passes through the power blades 24 to drive the compressor section, and the gas exits into another set of stationary vanes 46. It will be seen that a set of movable vanes 48 are shown cooperating with the stationary blades 46. Vanes 48 are provided with activators 50 which allow them to pivot through a small angle to provide changes in the duction of the gas passing therethrough. The redirected hot gas thence passes through blades 26 which drive the output shaft 12 provide output power from the turbine. The hot exhaust gas thence passes into exhaust plenum 52 where it may be ducted to atmosphere or passed through an heat exchanger for purposes of regeneration.

As this disclosure is concerned with cooling in the region of the machine between the two rotating shafts 12 and 14 hereinafter referred to as the split-shaft region, it will be convenient to describe the structural details of the gas turbine in this area before details of the mechanism of cooling are discussed.

Figure 2:
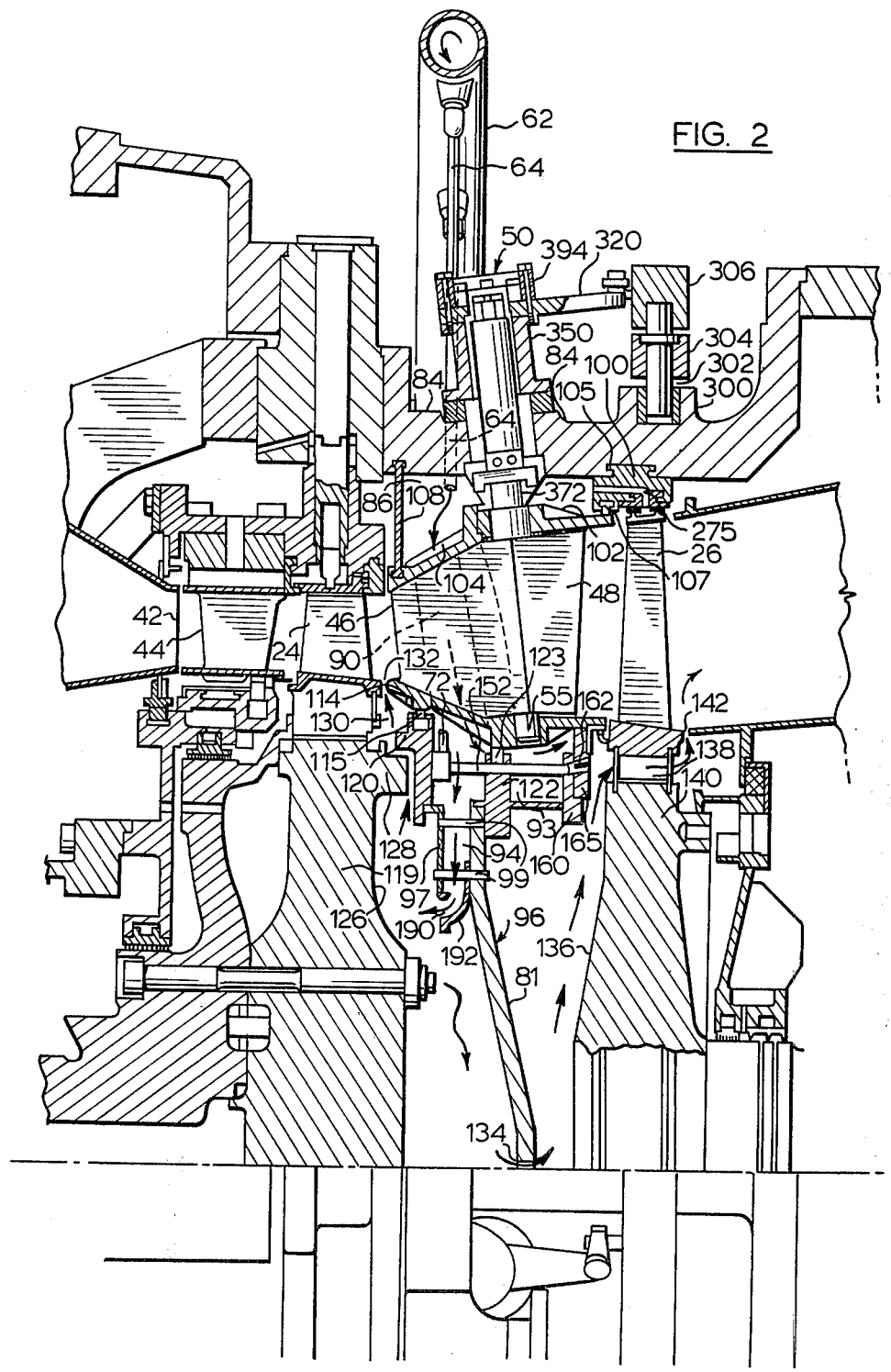
FIG. 2 is a partial sectional view of the "split-shaft" region of the turbine.
Figure 4:
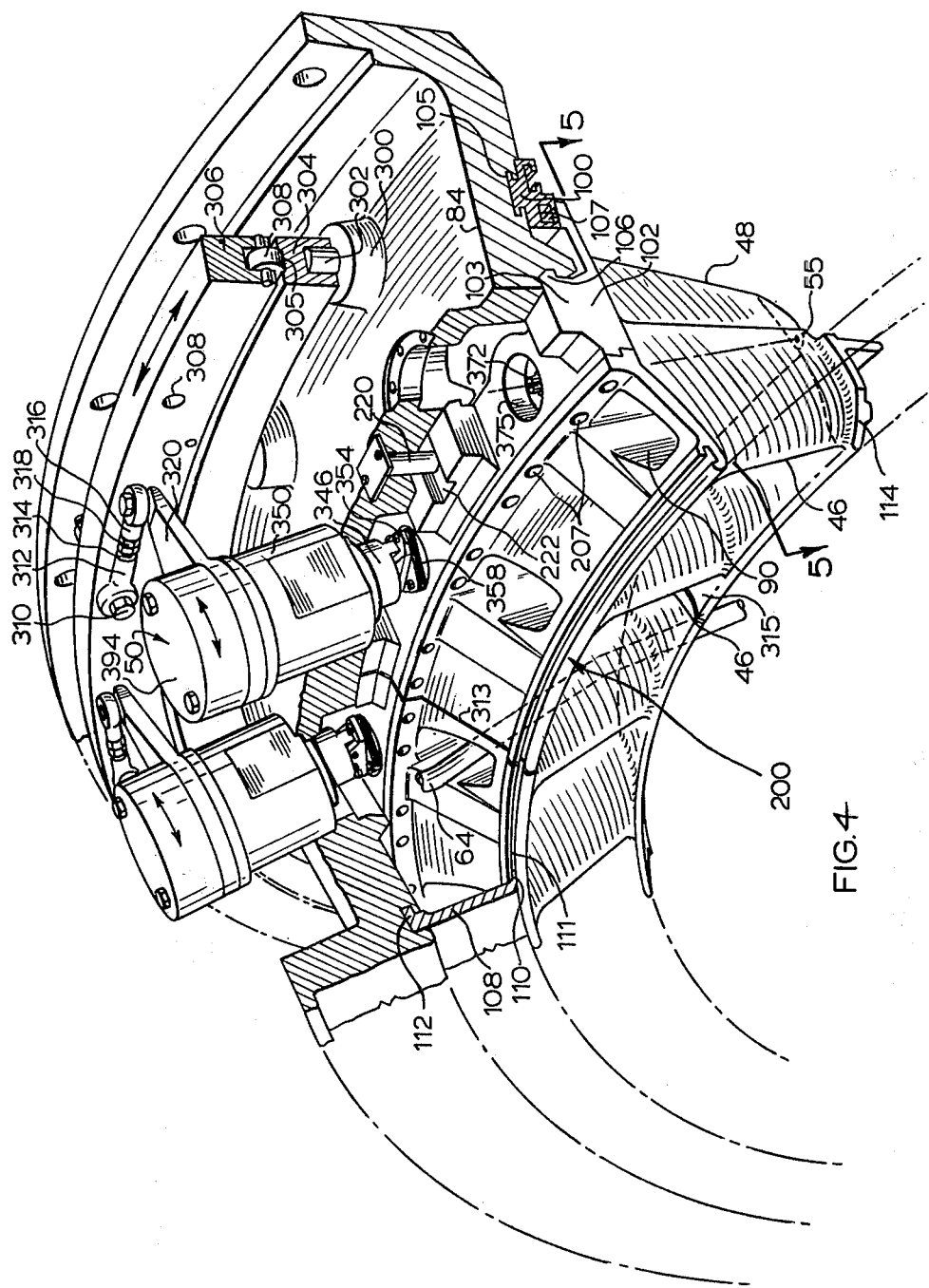
FIG. 4 is a perspective view of the turbine casing and vane assembly showing the conduit paths in this region.

FIGS. 2 and 4 provide detailed drawings of the mechanical structure of the machine in the area of concern.

The outer casing 84 provides the support for the balance of the interior members to be discussed. An inner casing member 102 is held firmly in a slot in casing 84 by means of projection and is keyed into member 100 which itself is keyed into the provided slot of 105 of casing 84. Member 102 and 104 are bolted together by means of bolts 207 to form a complete vane assembly 200. Member 200 provides confinement for the hot gas as well as imparting a predetermined velocity to the hot gas mixture. The structure 200 is securely attached to casing 84 by means of hooked members 108 which are secured in slot 110 and 112.

Assembly 200 has the stationary vanes 46 formed integrally therein and because of this structure the inner blade support 114 is held firmly in place in the gas stream. Member 114 is thus able to restrain the balance of the parts of the turbine to be described from undue movement.

A generally annularly shaped member 120 is keyed into member 114 at slot 115. Member 122 which has the general shape of an annulus is also keyed into member 114 at slot 123.

A disc shaped diaphragm member 96 is secured in the split shaft region between members 120 and 122. Projections 124 and 125 on members 120 and 122 hold member 96 in place. Annular spaces 92 and 93 are formed by the various turbine elements.

Cooling is provided in the split shaft region by air taken from an intermediate stage on the compressor turbine and is fed into the various areas in the split shaft region by a manifold assembly.

Figure 3:
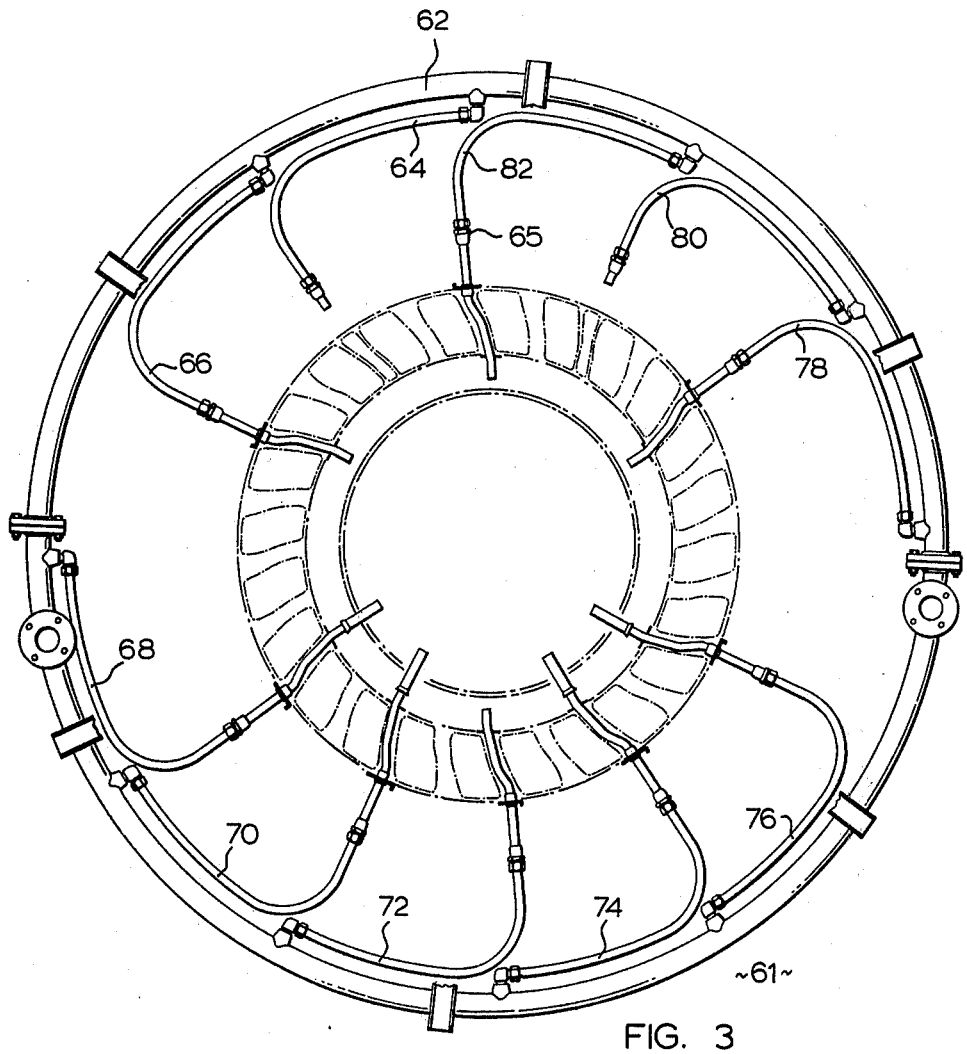
FIG. 3 is a view of the manifold assembly of the turbine looking down stream.

Referring to FIG. 1, compressed air is bled off by means of a series of holes 59 in the compressor casing and the compressed air is collected in housing 60. Suitable pipes or conduit feed the compressed air from housing 60 to header 62 of manifold assembly 61 (FIG. 3). The header 62 has a series of tubes or pipes 64-82 which are of a variable length to feed the compressed air through the housing 84 of the turbine to various internal parts about to be described.

The shortest pipes such as 64 and 80 pass through the outer casing 84 in a sealed manner, (members such as the one shown at 65 are arranged to provide the necessary seal), and are terminated in the space shown as 86. This air generally moves about the members 102 and 104 and passes around the upper part 372 of pivoting vane 48 through small holes 275 in member 100 gain access to the hot gas stream. Holes such as the ones at 275 are provided at spaced intervals around the turbine casing to bleed the heated air from the region of the outer pivot bearings and members 102 and 104 of the turbine.

Pipes such as 66, 72, 78 and 82 pass through casing 84 thence through openings 90 in the stationary vanes 46 (see FIG. 4) and are fed into box 150. An interconnecting pipe 152 ducts the compressed air through member 122 and through member 160. A series of small holes bleed the compressed air through member 165 by means of holes 162 to impinge on the blade roots region 138. The air passes through space 142 into the hot gas stream. It will be seen that this method of cooling the turbine apparatus ocurrs at 4 places (fairly evenly spaced, see FIG. 3 for the location of pipes 66, 72, 78 and 82) around the periphery of the diaphram 96. It will be noted that suitable piping such as 152 is provided at each location to carry the compressed air to region 138.

Pipes such as 66, 78 and 82 pass through casing 84, through the openings 90 in stationary vanes 46, and terminate in space 94 at a point just inside diaphram member 96.

Diaphram member 96 comprises a disc 81 to which is rigidly coupled an annular member 97 by means of roll pins 99 (or other suitable fastening means) located at spaced intervals around the disc 81.

A deflector 192 is filled to disc 81 to deflect air passing through space 190 to the left as shown in FIG. 2.

Pipes 66, 72, 78 and 82 thence empty essentially into the diaphragm member 96. Most of this compressed air is forced inwardly into the diaphragm member 96, because annular space 92 has very little leakage therefrom, thus most of the air delivered to the diaphram member 96 passes out past deflector 192 to impinge upon surface 126 of turbine disc 119. The air passes through the space between projection 128 of disc 119 and member 120 into space 130. This heated air passes through space 132 into the hot gas stream.

Some of the compressed air delivered through space 190 will be forced inwardly and escape through holes 134 in disc 81 to bath the surface of power output disc 136. This air thence passes outwardly through the root spaces 138 of the power stage blades 26 and through gap 142 into the hot gas stream.

It will be seen that the cooling air has been carefully metered and supplied to the various parts of the turbine in the split shaft region. In particular it will be noted that the various conduits feeding the innermost parts of the turbine pass through hollow openings 90 in stationary vanes 46. The reason for this is two fold:

1. The use of conduit in openings 90 provides some degree of insulation between the conduit and the stationary vane. This prevents the cooling air from being unduly heated as it passes through the stationary vane 46. This allows the compressed air to cool the innermost parts of the turbine more effectively.

2. Because less heat is extracted from vanes 46 than would have been if conduits such as 66 were not present, there is less tendency for member 104 to twist and warp due to thermal stresses.

It is well known by those skilled in the art that cooling must be supplied to certain of the innermost parts of a gas turbine. This disclosure seeks to supply the cooling air to these parts in a manner which stresses the turbine parts in the areas through which the cooling air passes to an extent where the resultant thermal stresses are not sufficient to interfere with the life or operation of the turbine.

The embodiments of the invention in which an exclusive property or privilege is claimed are defined as follows:

1. Cooling apparatus for cooling parts of a split shaft gas turbine in the region of the shaft split comprising, a turbine casing housing a compressor section and a power section, each section having a separate shaft mounted in suitable bearings for rotation of the shaft in each section, a stationary vane assembly mounted in the interior of said power section to deflect a hot gas stream in a predetermined direction, said vane assembly having a series of evenly spaced hollow vanes mounted in a circumferential manner therein, said vane assembly forming a first space between said casing and the vane assembly, said vane assembly serving to enclose a second space in the split shaft region of said turbine, said second space being formed in the interior of said turbine and being bounded by the compressor shaft and a compressor power disc mounted on the end thereof, and by the power shaft and a power disc mounted on the end thereof in the split shaft region, a diaphragm member mounted and supported by said vane assembly in said second space, said diaphragm member serving to divide the second space into two spaces, a forward compressor section space which has a controlled air outlet between said compressor power disc and said vane assembly, a rearward power section space having an outlet through a space in the blade root section of said power disc on said power shaft, bleed means on an intermediate stage of said compressor section, an enclosed compressed air housing surrounding said bleed means mounted on said compressor section, manifold means surrounding said turbine casing in the region of said shaft split, a plurality of tubes connected to said manifold means passing sealedly through said casing in circumferentially spaced relationship, said manifold means being connected to said compressed air housing to receive compressed air therefrom, said manifold having a first group of said plurality of tubes terminating in said first space, a second and third group of tubes of said plurality of tubes passing through said first space and through a predetermined number of said hollow vanes into said second space, said second group of tubes having air distribution conduit means connected thereto to direct air to the blade root section of said power disc on said power shaft, said third group of tubes being in communication with said forward compressor section space to provide cooling air for cooling said compressor power disc.

* * * * *